T. CARROLL.
CASH REGISTER.
APPLICATION FILED JUNE 4, 1903. RENEWED APR. 2, 1906.

967,496.

Patented Aug. 16, 1910.

Witnesses
Inventor
Thomas Carroll
Attorneys

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

967,496.  Specification of Letters Patent.   Patented Aug. 16, 1910.

Application filed June 4, 1903, Serial No. 160,025. Renewed April 2, 1906. Serial No. 309,353.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

My invention relates to certain new and useful improvements in cash registers and has more particular reference to improvements in the construction of the various parts of these machines, such as the transfer mechanism, the full stroke device, the turn-to-zero mechanism, and other devices which will be more particularly described hereafter.

I have shown and described my inventions and improvements as applied to the type of cash registers set forth in my co-pending application, Serial Number 52,479, filed March 23, 1901.

In the accompanying drawings forming part of this specification: Fig. 2ª represents a detail perspective view of the transfer pawls and trip pawls. Fig. 3 represents a section taken on the line 3—3 of Fig. 1.

In the aforesaid drawings, 1 represents the frame of the machine, 2 the operating key-levers and 3 the indicators. The key-levers 2 (see Fig. 2) are hung upon a transverse shaft 5 and are provided at their forward ends with suitable numbered or lettered finger buttons 2ª and are arranged in groups or banks in the usual manner in units of cents, tens of cents, and units of dollars. Since the banks are all of substantially the same construction, I shall describe only one bank. The key-levers are formed at their rear ends with graduated vertical standards 6 and each lever when in normal position rests with its rear end upon a transverse rigid supporting-bar 7 and is adapted to support an indicator stem 8 which rests upon said lever. These indicator stems have upon their upper ends the usual tablet indicators 3 which are marked on both sides with figures corresponding with the value of the key upon which they rest.

Each key-standard 6 has formed in its front edge near its base a key-coupler notch or recess 16 and near its upper end a registering notch or recess 17. The key-coupler notches are adapted to engage a bar 18 mounted in a key-coupling frame 19 which is fast upon a rock-shaft 20. The pivot points of the key-coupler and the keys respectively, are so located in relation to each other that when the keys are operated the coupler will be swung upward and the rod 18 caused to enter the key-coupler notches of the operated keys and thus lock all of such operated keys to the coupler. The registering notches 17 of the keys of each bank are located at different distances from a horizontal rod 22 of a register-operating rock-frame 23 according to the value of their respective keys, and the lower wall of each of said notches projects beyond its upper wall so that when the key is operated said lower wall will engage and lift said rod. It is evident that these registering notches need not be of any particular form, it being only necessary that they be arranged to engage the register-operating rock-frame 23 and lift it the proper distance according to the value of the particular key operated. For convenience, the register-operating rock-frames with their respective segments hereinafter described will hereafter be referred to simply as registering segments.

There are, of course, (see Fig. 1) three registering segments one for each bank of keys and they are all journaled upon a rocking-frame comprising a transverse swinging-shaft 24 (see Figs. 2 and 5) the ends of which are secured in two supports or side arms 25, which are pivoted upon the shaft 5. Since the rocking-frame which comprises these two said arms 25 and the swinging-shaft 24 operates to bring the registering segments into and out of engagement with the counter, I shall hereinafter refer to it for convenience as the counter-engaging-frame. It will be readily understood that the registering-frames are all pivoted upon the swinging shaft of the counter-engaging-frame. Each registering-frame is supported in its lower normal position by a stop-lug 23a (shown in dotted lines in Fig. 2) fast to the shaft 24. Each registering frame comprises a segmental rack-plate or segment 26 located at one end and is normally drawn down to its lower retracted position by a hook shaped drag-bar 27 pivoted thereto as at 27a and coöperating with the bar 18 of the coupler. When one of the registering-frames 23 is raised by a key, it becomes coupled to said key to prevent overthrow, by its bar 22 passing into the registering notch 17 of the operated key in much the same manner that the coupler-bar passes into the key-coupler notch. As the registering notches are located at different distances from the bar 22 it will be seen that the different keys will engage and move said bar different distances and thus rock the registering-frames correspondingly. The segments thus make movements corresponding in value to the value of the operated keys, which movements are transmitted to the counter-wheels in a manner hereinafter described.

Each registering frame is normally locked in its lowermost position by one of a series of three latch-arms 28 one for each bank of keys which are mounted loosely on a transverse shaft 29 (Figs. 2 and 3), and normally forced forward to bring their notched locking ends 30 over the respective rods 22 by coil springs 31 interposed between said latch arms and the main frame. Each latch-arm is also provided with a transverse unlocking bar 32 projecting to each side and arranged to be struck by the upper edges of any one of the standards 6 to throw the latch-arm back out of the path of the bar 22 and thus unlock the corresponding registering-frame. The initial movement of any key, therefore, unlocks its corresponding registering frame.

Figures 5, 6, 7, 8:
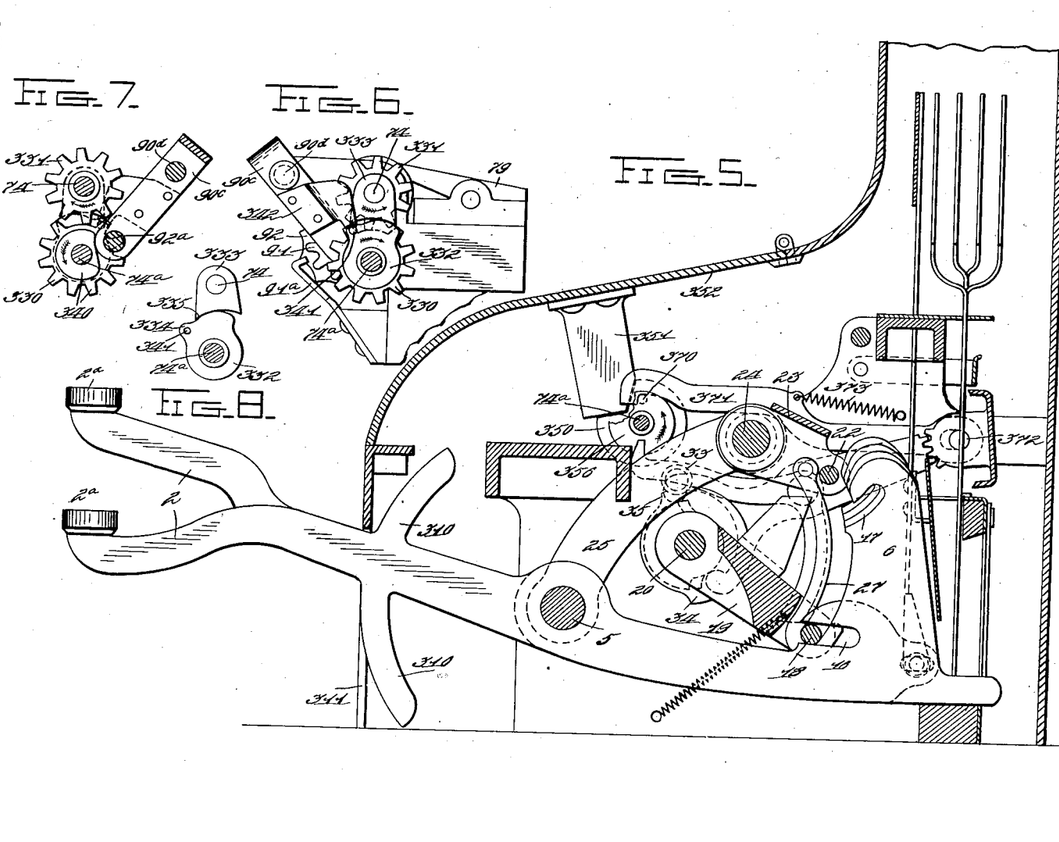
Fig. 5 represents a section taken on the line 5—5 of Fig. 1 showing the casing and the locks for the turn-to-zero device.
Fig. 6 represents a detail end view of the counter showing the turn-to-zero devices.
Fig. 7 represents a sectional elevation of the same looking from the opposite end from Fig. 6.
Fig. 8 represents a detail of the turn-to-zero device.

As before mentioned the shaft 24 which supports the registering-frames is mounted in supports or arms 25 and each of these arms is pivoted upon the shaft 5, and is provided with a laterally projecting anti-friction roller 33 as shown in Fig. 5. These rollers are arranged to be engaged and forced upward by counter-engaging cam-disks 34 mounted on shaft 20 and fast to and movable with the key-coupling frame 19. As the key-coupler moves upward the anti-friction rollers are forced upward and forward out of cam notches 35 formed in said counter-engaging cam-disks which action brings the rack-segments 26 into mesh with the counter pinions 69 hereinafter described. This counter-engaging movement of the rack-segments precedes their rocking or registering movements. As soon as the segments have completed their registering movements they are moved backward with and by the counter-engaging frame because of the lateral or transverse shifting of the key-coupler 19 and the counter-engaging cams 34, which shifting causes the said cams to pass laterally out from under the anti-friction rollers 33 so that said rollers, the counter-engaging frame and the registering frame drop back into disengaged position. This lateral shifting movement of the key-coupler frame, the counter-engaging-cams and the shaft 20, which last simply slides in its bearings in the main frame, is effected by means shown best in Fig. 4. Fast upon and projecting upwardly from the right-hand end of the key-coupler frame 19 is a camming arm 37 adapted to engage the beveled surface of a cam collar 39 which is fast upon the shaft 24. There is also fast to and extending upwardly from the key-coupler 19 a second camming arm 38, adapted to engage the beveled surface of a second and similar cam collar 40 which is also fast upon the shaft 24. Upon the upward movement of the key-coupler the arm 37 strikes the beveled surface of the collar 39 and the key-coupler is thereby forced laterally to the left; and near the end of the downward movement of the key-coupler the arm 38 comes in contact with the beveled surface of the cam collar 40 and the key-coupler is thereby forced laterally to the right and is thereby carried back to its normal position, It is, of course understood that this lateral shifting of the key-coupler to the left takes place at the end of the initial downward movement of the key-lever 5, and the shifting to the right takes place at the end of the final upward movement of the keys. As soon as the key-coupler has been shifted to the left in the manner just described, the counter-engaging-cams 34 are shifted from beneath the anti-friction roller 33, but at this point the arm 37 has come in contact with the shaft 24 and this arm thereby serves to support the shaft 24 and the counter-engaging-frame 25 in its upward position; and then as the arm 37 moves downward with the key-coupler, the shaft 24 resting upon it moves downward with it until the shaft 24 comes in contact with the lower surface of its enlarged bearing 24a formed in the side frames of the machine (see Fig. 2), and the counter-engaging-frame 25 thereby rests in its lowest position while the key-coupler 19 and the supporting arm 37 continue in their downward movement. It is thus obvious that the arm 37 serves both as a camming arm and as a supporting arm. A duplicate series of these camming arms and cam collars may be placed at the left-hand end of the machine, to insure greater certainty of movement.

It will be readily understood that the various parts which are herein described as secured to and movable laterally with the key-coupler, might well be secured to and moved by any other member of the machine organization which has a uniform movement at each operation of the machine.

The general operation of the mechanism thus described is therefore as follows: The initial movement of any key turns the counter-engaging-cams in the direction of the arrow (Fig. 2) and thereby the counter-engaging-frame is raised, throwing all the segments into engagement with their respective counter-wheels. The segments are held thus engaged during the entire downward or initial stroke of the keys, during which time the segment-frames are engaged by the key standards and swing upon their shaft 24 so as to turn the respective counter-wheels according to the value of the operated keys. At the very end of the downward movement of the keys the key-coupler frame and the various members secured thereto, including the counter-engaging-cams, are shifted laterally to the left and the cams pass out from under the rollers 33. The counter-engaging-frame and the registering-frame carried thereby do not, however, drop immediately, as the pressure on the operated key holds the registering-frames in engagement with the counter pinions and thereby sustains the counter-engaging-frame in its upper position. The instant, however, that the pressure upon the key is relaxed to permit it to begin its return movement, the registering frames drop out of engagement with the counter pinions and the counter-engaging-frame then drops with its supporting arm 37 until the shaft 24 rests in the bed of the enlarged bearing 24ª. The key-coupler continues its downward movement, and at the end of this downward movement is again shifted laterally to its normal position with the cams 34 again below the rollers 33.

The segments remain out of engagement with the counter pinions during the entire return movement of the operated keys, so that the rear ends of said keys in swinging downward, first return the segments to normal position, that is, until the registering frames contact with their stop-lugs 23ª, whereupon the latch-arms 28 spring into position to lock the segments. As soon as the registering frames are thus stopped the keys swing out of engagement therewith and return to normal position.

The mechanisms and operation hereinbefore set forth and described, are, with the exception of the particular means for shifting the key-coupler, the same as described in the aforesaid co-pending application and are made the subject of claims therein; and I have set them forth here in order to make clear the nature of my improvements, the remaining ones of which I shall now proceed to describe.

Figures 2, 2A:
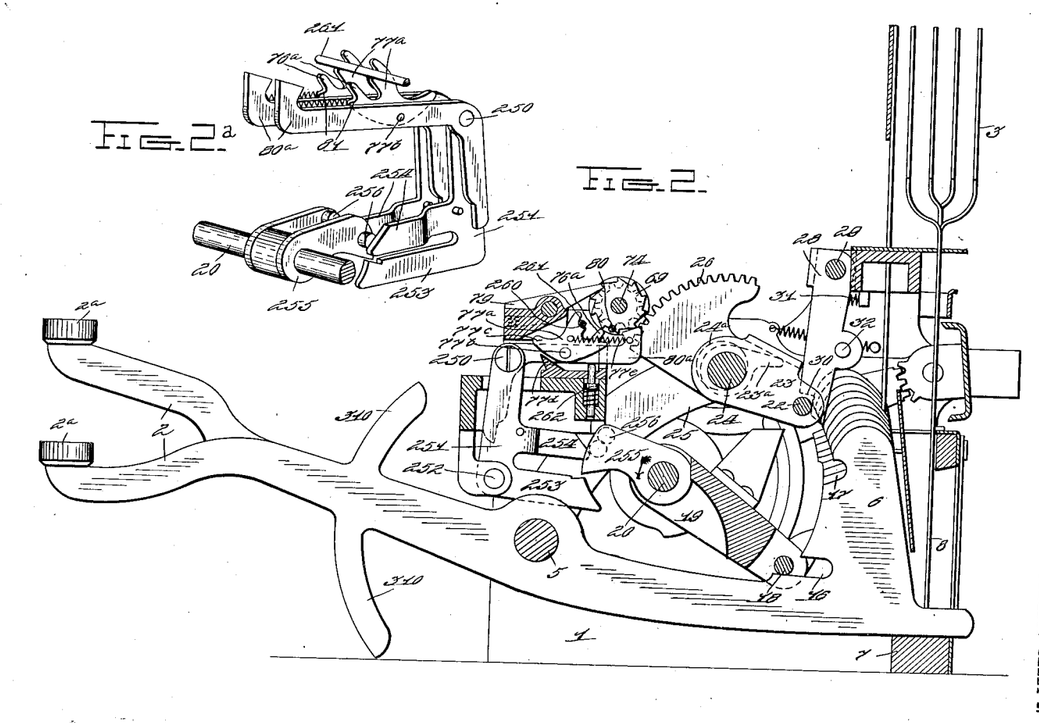
Figures 2, 4:
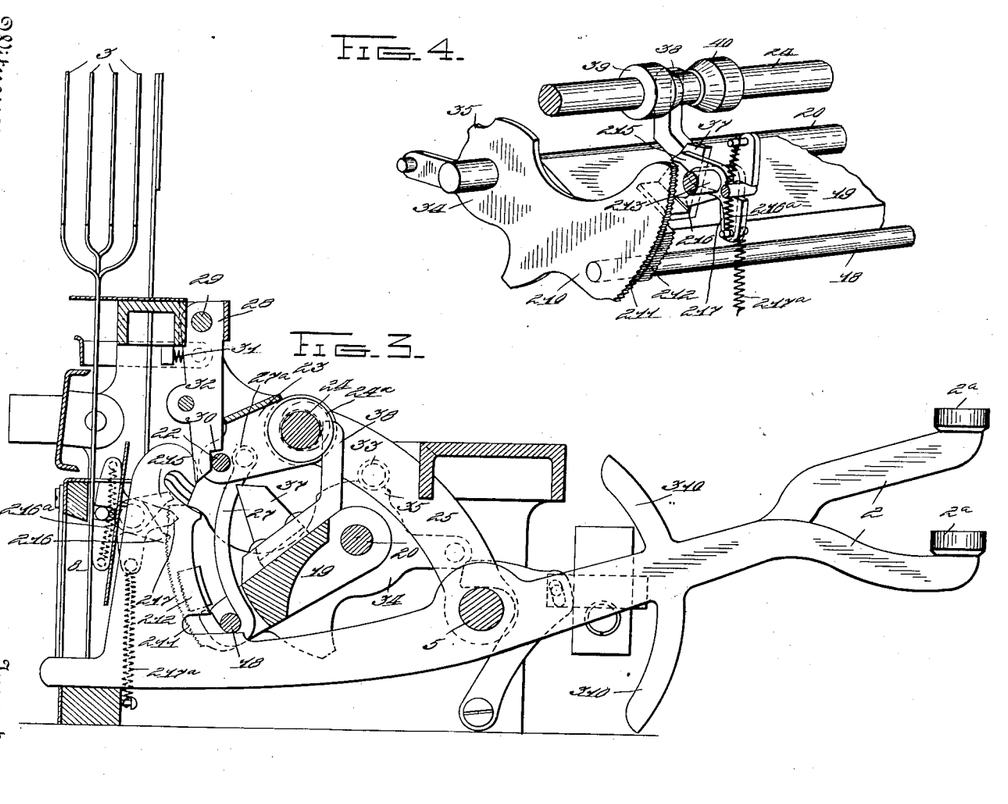
Fig. 2 represents a section taken on the line 2—2 of Fig. 1.
Fig. 4 represents a detail perspective view of the full stroke device and the mechanism for shifting the key-coupler.

*Full stroke mechanism.*—The full stroke device, to compel a complete movement of the operated key in both directions, is shown best in Fig. 4. Fast upon one end of the key-coupler is a segment plate or rack 210 having arrester teeth 211, which rack may for convenience be called the main arrester rack. Secured to the side of this main arrester rack is an auxiliary arrester rack 212. Pivoted upon a stub-shaft 213 extending from the main frame of the machine are two main arrester pawls 215 and 216 and situated alongside of them is an auxiliary arrester pawl 217. These three pawls are adapted to be held in engagement with their respective racks by means of springs numbered 216ª, 217ª. The pawl 215 lies normally in lateral alinement with the main arrester rack 210 and the pawl 216 lies normally out of lateral alinement with said rack; and on the upward movement of the key-coupler the pawl 215 engages the rack to hold it from a retrograde movement. Upon the shifting of the key-coupler in the manner before described, this main rack 210 is shifted out of lateral alinement with the pawl 215 and into lateral alinement with the pawl 216, which pawl then engages said main rack on the downward movement of the key-coupler and prevents retrograde movement of the same. It is thus seen that this arresting movement of the key-coupler in its two opposite directions of movement is effected by having a single arrester-plate which is shifted with the key-coupler from one arrester pawl to another. With this arrangement of shifting the main arrester-rack from one pawl to another, it might possibly happen that the key-coupler for some reason would be prematurely shifted, in which case the rack 210 would be shifted out of engagement with the pawl 215 before the key-coupler had reached the limit of its upward movement, and consequently before the key lever had reached the limit of its downward movement; and if the key were then released it would be free to return to its normal upward position without having completed its full downward stroke, and therefore without having imparted to the registering segments the full movement of registration. It is the purpose of the auxiliary arrester and pawl to prevent such an occurrence whether it be by accident or by intentional manipulation by the clerk. The auxiliary arrester rack 212 is shorter in extent than the rack 210 and is engaged by pawl 217 toward the end of the upward stroke of the key-coupler; and when the key-coupler is just ready to shift to the left, the pawl 217 is still in engagement with the rack 212; and the teeth on this rack are made of such width that the pawl 217 will slide laterally over them and still remain engaged with them during the lateral shifting movement of said rack to the left with the key-coupler. When this shifting movement has been completed, it is obvious that, as before described, the main rack 210 is no longer in lateral alinement with the main pawl 215 and the pawl 215 is therefore free from engagement with said rack and is not performing any arresting functions; but the downward extent of the auxiliary rack 212 is such that while the key-coupler is shifting, and after it has been shifted, the pawl 217 is still in engagement with its rack 212 and the key-coupler must therefore be raised to the limit of its upward position before the pawl 217 reaches the end of the rack 212 and drops free therefrom, whereupon the key-coupler is free to descend. On the descent of the key-coupler, however, the rack 210 is now engaged by the second main pawl 216 in the manner before described which prevents retrograde upward movement of the key-coupler. On the downward movement of the key-coupler, the pawl 217 will of course again engage the rack 212 and will therefore act as an arrester during such time as it is in engagement therewith but this is a mere incident of the construction and is not essential, since the arresting function during this downward movement of the key-coupler is performed by the pawl 216, as before described. It is to be understood that this auxiliary pawl and rack need not be necessarily situated and constructed as I have shown and described them, but other forms of device may be used provided that the auxiliary arrester pawl is brought into engagement with its rack before, or as soon as, the main pawl has been freed from engagement with the main rack, and the auxiliary rack is of such extent as then to compel a complete upward movement of the key coupler. Another means of compelling a complete upward movement of the key-coupler even after the shifting has taken place would be to have a single pawl adapted to act in both directions in a well known manner, and to have all the teeth 211 on the rack 210 widened so that this pawl would remain in engagement with the teeth regardless of the shifting movement; but in such a device, when the pawl arrived at the end of the rack and dropped off ready to engage the rack on the downward movement, there would be a certain interval before the rack would again engage the pawl in this downward movement, and this interval would leave the machine open for manipulation. By the use of this auxiliary pawl, the key-coupler must be given its full upward stroke and then the main pawl 216 is in position to engage the main rack 210 immediately upon the beginning of the downward movement of the key-coupler.

*Transfer mechanism.*—The registering segments 26 coöperate with the counter pinions 69, 70 and 71 which are actuated by the respective banks of keys, to turn them forward; they then become disengaged therefrom. (See Fig. 1). The pinion 69 of the units-of-cents wheel 72 is mounted fast upon one end of the units-of-cents shaft 73 which is suitably journaled in the main frame. Various counter wheels are mounted upon the counter shaft 74 (Fig. 6) which shaft is suitably journaled in the counter frame and is in line with and preferably of the same size as the units-of-cents shaft 73 so that their ends abut. The right-hand end of this counter shaft 74 projects through the wheel 72 and partly into the ratchet wheel 75 which is fast to said counter wheel. The counter wheels 76 and 77 are journaled upon the shaft 74 and are secured to and carried by the gears 70 and 71. Each counter pinion 70 and 71 is also provided with a ratchet wheel 78 similar to wheel 75. Each ratchet wheel is engaged by a spring pressed retaining-pawl 79 suitably mounted on the counter frame, so as to prevent any backward rotation of the counter wheels.

Figure 9:
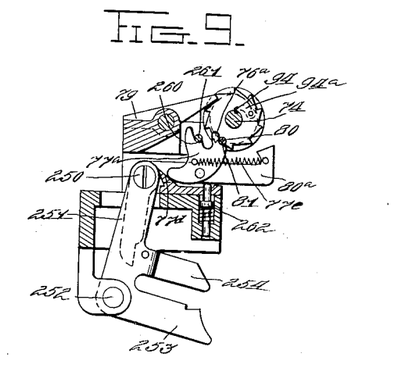
Figs. 9 and 10 represent detail sectional views of the transfer devices.
Figure 10:
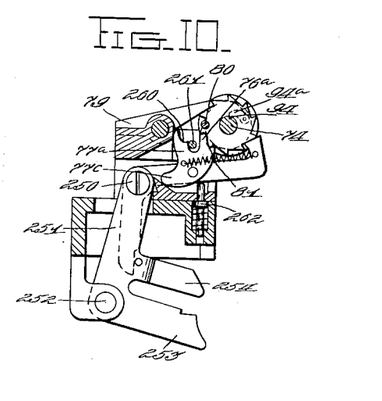

The "transfer" from counter wheel 72 to counter wheel 76 and from the latter to the counter wheel 77 is effected in the following manner: Each of the wheels 72 and 76 is provided with a laterally projecting tripping pin, 80 (see Figs. 1 and 2) and when the counter wheel has made a complete revolution this pin 80 contacts with a nose 76ª formed upon a spring pressed trip latch 77ª (see Figs. 2 and 2ª) which trip latch is pivoted at 77ᵇ upon the transfer pawl 80ª. This transfer pawl 80ª is pivoted as at 250 to a lever 251 pivoted to the main frame at 252. This lever 251 has two rearwardly projecting arms 253 and 254, the upper arm 254 being slightly bent so as to be out of lateral alinement with the arm 253. These arms are adapted to coöperate with an arm 255 fast upon the key-coupler shaft 20 which arm carries at its outer edge a pin 256. On the upward movement of the key-coupler, the arm 255 moves downward, and its outer surface contacts with the arm 253 carrying said arm downward and thereby rocking the lever 251 about its pivot 252 carrying the transfer pawl 80ª rearward to the position shown in Fig. 9. In both this rearward position and in its normal forward position as shown in Fig. 2, the transfer pawl 80ª is held from engagement with its counter wheel by the abutting of a shoulder 260 on the trip latch 77ª against a stationary transverse rod 261, and said trip latch is constrained to its position of engagement with said rod by a spring 77e extending between the latch and the transfer pawl 80a. But when the counter wheel has made a complete revolution, the pin 80 contacts with the nose 76a and forces the trip latch 77a out from engagement with the transverse bar 261 and the transfer pawl 80a is thereupon forced upward by the spring pressed plunger 262 into engagement with its counter wheel, which position is shown in Fig. 10. This occurs during the down stroke of the arm 255 and when the pawl 80a has moved to its rearward position; and at the end of the down stroke of the arm 255 the key-coupler is shifted and the arm 255 is thereby carried out of coöperative alinement with the arm 253 but the pin 256 is thereupon brought into alinement with the arm 254 and contacts with the same on the up stroke of the arm 255, whereupon the lever 251 is carried into its normal forward position and the transfer pawl 80a is moved forward sufficiently to turn the counter wheel one notch. On the transfer pawl resuming its normal forward position, the tail 77c of the trip latch 77a strikes against the inclined abutment 77d rising from the base of the counter frame, and the trip latch again resumes its normal position with the notch 260 under the bar 261 and in this re-cocking of the trip latch, the spring 77e also aids. Of course there is a transfer arm and a transfer pawl for each of the wheels 76 and 77 and the pins 256 are so arranged that they contact with their respective arms 254 successively in such manner as to cause the operation of the transfer pawls successively in the usual manner. It is thus apparent that the transfer pawl and the trip latch are normally out of operative position with respect to the tripping mechanism, but that they are reciprocated into operative position upon the initial movement of the keys and then withdrawn to their normal position.

In cash registers as heretofore constructed much trouble has been met on account of the fact that the transfer pawl, when a registration is made with unusual violence, would be prematurely tripped. For example, in case the amount to be recorded would normally and properly bring the registering wheel to its "9" position and thereby its tripping pin would be only one notch from transferring position, then in such a case, if the machine is operated violently, the registering wheel will be slightly overthrown beyond its "9" position, and although not far enough to assume its zero position, its tripping pin, however, would strike the tripping nose of the trip latch with force enough to send the trip latch ahead of the tripping pin in such manner as to trip the transfer pawl prematurely and therefore the amount would be improperly registered. I guard against this by providing the trip latch 77a with an over-throw preventing shoulder 81 (see Figs. 2a, 9 and 10) which shoulder is formed adjacent to the tripping nose 76a. In the normal operation of the transfer, the tripping pin 80 passes over the shoulder 81 and is pressed against the tripping nose 76a and thereby trips the trip latch from under the fixed rod 261; however, if the machine is operated violently in the manner before described and the tripping pin 80 is given an overthrow movement, the trip latch 77a is nevertheless prevented from being driven ahead of the tripping pin 80 upon such overthrow movement by reason of the fact that as soon as the tripping nose 76a begins to leave the pin 80 the shoulder 81 immediately comes up against the underside of the pin 80, and the trip latch therefore cannot move forward unless the pin (and thereby the entire registering wheel) is moved with it; and in such cases the registering wheel never has an overthrow movement to such a great extent as to allow the tripping pin completely to trip the latch. Furthermore, when the registering wheel settles back to its "9" position after overthrow, the pin 80 abuts against the shoulder 81 and carries the tripping latch back with it to its proper position.

The above described transfer devices relate only to the primary counting wheels or those receiving motion directly from the registering segments 26. In order, however, to give the machine capacity for registration of total amounts, I have provided my registering counter with adding wheels of higher denomination such as is customary in such a machine. The number of such higher adding wheels may be regulated at will according to the desired capacity but I have shown three of such wheels 87 (see Fig. 1) mounted loosely upon the counter shaft 74. It is of course necessary to have some sort of transfer device between these adding wheels 87. This transfer may be effected by means of intermediate transfer pinions 91 (see Fig. 6) and locking star wheels 92 which are mounted upon a suitable shaft 92a in a yoke shaped disengaging frame 90c suitably pivoted in the counter frame on a short transverse shaft 90d. However, since this part of the transfer mechanism between wheels of higher denomination constitutes no part of my invention and since various devices are well known in the art to accomplish this purpose, I have not shown nor shall I describe such mechanism in detail, any one of the various forms being suitable for the purpose.

*Turn-to-zero.*—The resetting devices for turning the counter wheels to zero are all operated by turning the thumb button 110

Figure 1:
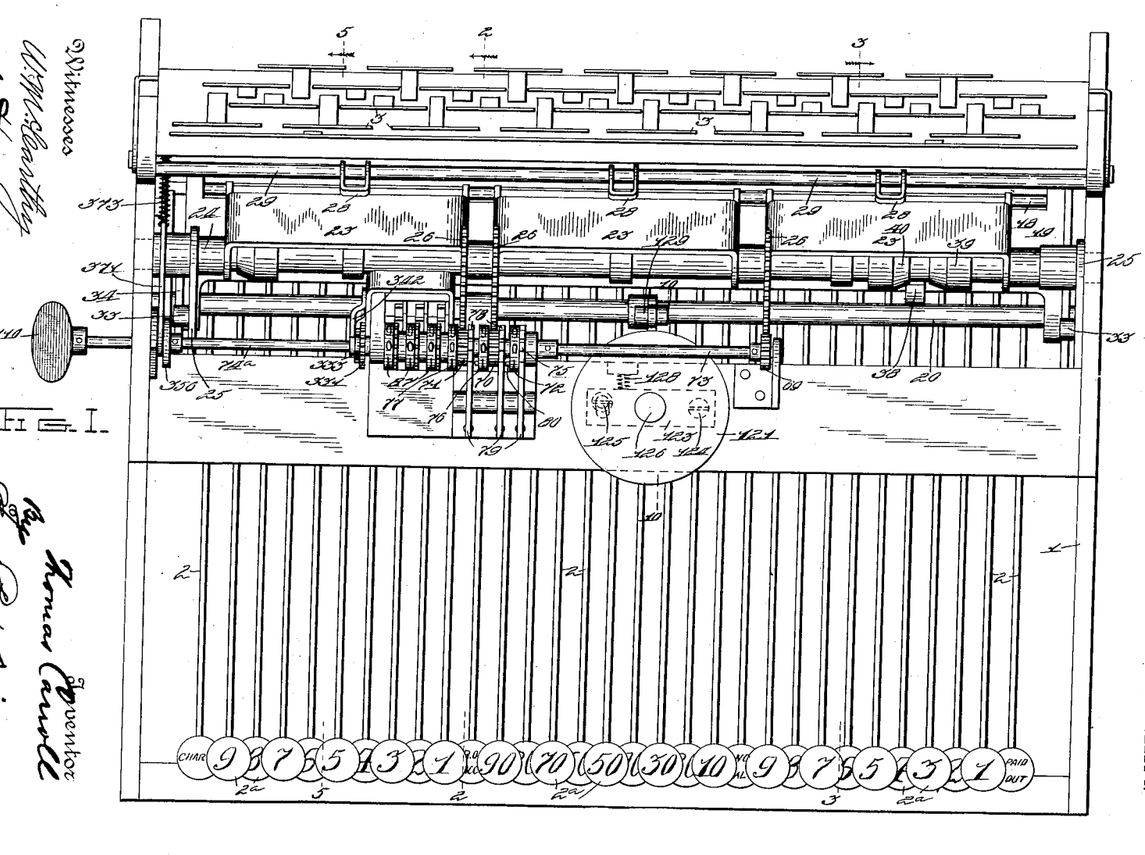
Figure 1 represents a top plan view of the machine with the casing removed.

(see Fig. 1). This thumb button is fast upon the turn-to-zero shaft 74ᵃ which extends through the side frame of the machine and is journaled at the other end in the counter frame and at this end has fast upon it a pinion 330. (See Fig. 6). This pinion 330 meshes with a pinion 331 which is fast upon the left-hand end of the counter shaft 74. Fast upon the pinion 330 is a locking cam disk 332 which engages a similar locking cam disk 333 fast upon the pinion 331. The shape of these locking cams is better shown in Fig. 8, the upper cam 333 being formed with a concave sliding surface, and the lower cam 332 being formed with a corresponding convex sliding surface, adjacent to which however is a projecting nose 334, the purpose of which formation will appear hereinafter. Each of the pinions 330 and 331 has ten teeth, but the pinion 330 is larger in diameter than pinion 331 and is so constructed as to have one missing tooth. The normal position of the turn-to-zero device is as shown in Fig. 6, but on beginning to turn the pinion 330, by means of the thumb button 110, in the direction shown by the arrow in Fig. 6, the lower pinion 330 is given an initial movement (on account of the missing tooth) before the pinion 331 starts to rotate. Thus the projecting nose 334 of the cam disk 332 is carried beyond the center of the concave surface of the cam disk 333 and therefore the cam disks are no longer in locking position but the pinion 331 and its cam disk 332 carried thereon are now free to move and the lower corner 335 of the disk 333 swings down behind the moving disk 332 and is not obstructed thereby. As soon as the pinion 330 has made one complete rotation the cam disks 332 and 333 are again brought into their normal locking position, but the shape of the upper edge of the cam disk 332 is such (as shown in Fig. 8) that the cam disk 333 is given a slight retrograde movement at the end of the revolution of the disk 332. This result is accomplished by reason of the fact that toward the end of the revolution of the disk 332, the projecting nose 334 formed on said disk contacts with the lower corner 335 of the disk 333 and thereby cams this disk 333 (and therefore the pinion 331) backward for a slight retrograde movement. This retrograde movement of the pinion 331 is possible since at this point there are no teeth of the pinion 330 in contact with the teeth of the pinion 331 owing to the missing tooth of the pinion 330. Furthermore it is evident from this construction that the pinion 331 is given a slight "overthrow" movement by the pinion 330, that is, slightly more than one complete revolution, and is then given this slight retrograde movement at the end of its revolution, all of which takes place upon one complete revolution of the pinion 330. The purpose of such slight overthrow movement of the pinion 331 and the slight retrograde movement will now be explained. As before stated, the pinion 331 is fast upon the counter-shaft 74. This shaft 74 has formed in it a longitudinal groove 94, (see Figs. 9 and 10), and the radial wall of this groove engages spring pressed pawls 94ᵃ, which pawls are carried one upon each counter wheel, and thus the said counter wheels will be picked up and turned to zero in a manner the general features of which are well known in the art. It is therefore evident that if the pinion 331 is given a slight overthrow movement at the end of its revolution, the shaft 74 will cause the counter wheels to be carried slightly beyond their zero position whereby the retaining-pawls 79 will be insured of dropping behind their respective ratchet wheels; and then the slight retrograde movement of the pinion 331 will cause the counter wheels to be brought back against their retaining pawls and into proper alinement. By this means I have obviated the necessity of the nicety of adjustment to carry the counter wheels to their zero positions and have the retaining pawls drop into place, and furthermore I have insured a positive retrograde movement of the counter wheels back to their correct positions against the retaining pawls and thereby it is impossible for the counter wheels to remain overthrown to such an extent that the teeth of their respective gear wheels would bind against the teeth of the operating segments 26 and thereby prevent the machine from registering. I have also provided the pinion 330 with means for disengaging the intermediate transfer mechanism for the wheels 87 of higher denomination. Fast upon the pinion 330, and on the opposite side from the locking disk 332 is a cam disk 340 (see Fig. 7) which engages the lower end of the disengaging frame 90ᶜ and swings the same forward on the first part of the movement of the pinion 330 thereby carrying the transfer pinion 91 and the locking disk 92 out of mesh with the counter wheels 87 and allowing them to be turned to zero; and the transfer pinion 91 and locking wheel 92 are held from turning upon this forward movement by means of the retaining pawl 91ᵃ which is made fast to the counter frame. Upon the end of the rotation of the pinion 330 the pin 341 (see Figs. 6 and 8), mounted upon the locking disk 332, engages an arm 342 fast upon the disengaging frame 90ᶜ and carries the disengaging frame forward into the normal position with the transfer pinions and star wheels in contact with their respective counter wheels. It will also be observed that the pin 341 is drawn from beneath the arm 342 during the initial movement of the pinion 330 thus allowing the disengaging frame 90ᶜ to be swung forward upon the action of the cam 340.

On the turning to zero of the primary counting wheels 72, 76 and 77, it will be noticed that the transfer tripping pins 80 carried upon these wheels (see Fig. 2) do not trip the trip latches 77ᵃ since these are normally held retracted in inoperative position and out of the path of movement of said tripping pins. Thus on such turning to zero of the counter, it is not necessary to displace the primary transfer pawls or trip latches, such as is necessary in some machines where the transfer pawls or trip latches are normally in operative position.

Since the operator might neglect to give a complete rotation to the thumb knob 110 and thus would neglect to return the counter wheels completely to zero, I provide a means to insure a complete rotation of the shaft 74ᵃ. Mounted fast upon this shaft upon the inner side of the side frame of the machine is a disk 350 (see Figs. 1 and 5) which has formed in it a locking notch, and an arm 351 fast upon the lid 352 of the casing of the machine, is so situated as to engage the notch of the disk 350 and in case the disk 350 has not been given a complete rotation the lower side of the arm 351 will engage the corresponding upper side of the said notch and carry the disk 350 home to its position of complete rotation. It is also to be observed that this arm 351 serves to lock the disk 350 from rotation while the lid 352 is in its normally closed position and thereby it is impossible to set the machine to zero while the lid 352 is closed.

Figure 12:
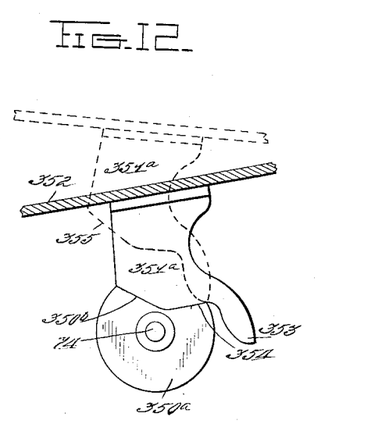
Fig. 12 represents a modification of the turn-to-zero devices.

In Fig. 12 I have shown a modified form of the arm 351 attached to the lid 352 which modified form embodies the advantages of insuring a complete returning to zero of the counter wheels and a locking of the turn-to-zero device while the lid is closed and also serves to give the counter wheels the slight overthrow movement followed by the slight retrograde movement which is desirable in such turn-to-zero devices as before described. In this case, as shown in Fig. 12, the counter shaft 74 is extended through to the side frame of the machine and is journaled therein and carries a disk 350ᵃ corresponding to the previously mentioned disk 350 and this disk 350ᵃ has formed in it a notch 350ᵇ. Extending downward from the lid 352 is a peculiar shaped arm 351ᵃ which is adapted to engage the notch 350ᵇ and the shape of which is best shown in dotted lines in Fig. 12. When the shaft 74 has been rotated on the turning to zero of the counter, then upon the closing of the lid 352, the finger 353 of the arm 351ᵃ comes in contact with the rearward side 354 of the notch 350ᵇ and carries the disk 350ᵃ onward a small amount in the same direction of rotation as shown by the arrow (Fig. 12), thus imparting a slight overthrow movement to the shaft 74. Then at the completion of the downward movement of the lid, the inclined surface 355 of the arm 351ᵃ comes in contact with the forward surface of the notch 350ᵇ and forces the disk 350ᵃ backward from its overthrow position to its normal position as shown in full lines in Fig. 12, thus imparting to the shaft 74 the desired retrograde movement above referred to. It is also evident that this arm 351ᵃ serves to lock the turn-to-zero device from operation while the lid is closed and thus there is combined in this one device the means for giving the turn-to-zero device a slight overthrow movement followed by a slight retrograde movement and also a means of locking the turn-to-zero device while the lid is closed. Of course when the proprietor or clerk wishes to reset the machine to zero, he must first raise the lid 352 before the turn-to-zero device will be unlocked, and then on closing the lid the complete turning to zero of the counter is insured and the devices again locked as above described. The lid which I have described may well be the one which is used on cash registers to expose the registering wheels to view, but these devices as above described for completing the turn-to-zero movement and for locking the shaft may as well be controlled by any other guard or movable plate, such, for example, as the one which the proprietor customarily moves in examining the condition of the machine or in preparing the machine for use in any way. I have also provided a means for automatically stopping the turn-to-zero device at the end of one complete revolution, so that the counter wheels cannot again be turned to zero until a key has been operated. Fast upon and projecting laterally from a disk 356 fast on the turn-to-zero shaft 74ᵃ is a pin 370. (See Figs. 1 and 5.) Resting above this pin is a hooked arm 371 which is suitably pivoted upon a shaft 372 extending from the side arm of the machine and is slotted at its pivoted connection so that it may have a backward movement under the tension of a spring 373. This arm 371 normally rests upon the transverse shaft 24 which, as before described, is carried upward with the counter engaging frame 25 at each operation of the machine. After the counter wheels have been set to zero the pin 370 contacts with the hook of the arm 371, and the disk 356, (and thereby the turn-to-zero shaft 74ᵃ,) is thus prevented from further forward movement; but upon the operation of any key, the shaft 24 is elevated and the arm 371 thereby is also elevated so that the hook of said arm becomes disengaged from the pin 370 and the spring 373 thereupon carries the arm 371 backward so that the hook rests upon the upper surface of the pin 370 and no longer holds the pin from forward movement and therefore the counter then can again be set to zero.

Figure 11:
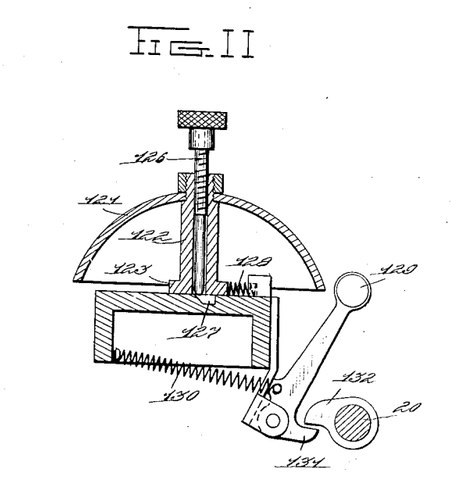
Fig. 11 represents a detail vertical section, on the line 10—10 of Fig. 1, of the bell and the bell stop mechanism.

*Bell stop device.*—A bell 121 (see Figs. 1 and 11) is mounted rigidly upon a vertical standard 122 formed on a plate 123 which is pivoted as at 124 upon the main frame and is formed at its opposite end with an elongated slot through which a bolt 125 passes to secure that end of the plate movably to the main frame. A screw or bolt 126 is mounted in the standard 122 and is formed with an upper thumb nut by which the bolt may be screwed downward. Formed in the main frame below the bolt 126 is a recess 127 having an inclined face and when the said bolt is screwed downward, the end thereof comes in contact with this inclined face and the bell is thereby swung upon its pivot 124 against the tension of a compression spring 128, into the path of action of the bell clapper 129. This clapper is suitably pivoted to a bracket hung from the main frame and is normally drawn forward by a coiled spring 130 which connects it to the main frame. The lower end of the clapper or hammer is formed with a lateral projection 131 which is arranged to be struck by an arm 132 fast to the shaft 20. As the key-coupler rises, the arm 132 is rocked downward and contacting with the projection 131 draws the clapper back against the tension of its spring. When the shaft 20 moves laterally at the end of the upward stroke of the coupler, the arm 132 then passes out of alinement with the projection 131, and the clapper is free to spring forward and strike the bell. During the backward movement of the key-coupler, the arm 132 passes free of the projection 131.

*Key guards.*—In some of the so-called key machines heretofore used, it has been possible to insert a wire through the slots in the casing through which the key-shanks project, and it was thereby possible to manipulate the machine. To prevent this, I have provided each key lever with curved arms 310 extending vertically on either side of the key-shank (see Fig. 5.) These curved arms are formed concentric with the pivotal point of the keys namely, the shaft 5, and are at such distance from said shaft that they fill up and project slightly through the slots 311 in the casing, through which slots the keys project. It is thus obvious that regardless of what position the key may be in, these curved arms serve to fill up the exposed space in the slot and thereby prevent the insertion of any wire into the same.

Certain of the inventions contained in the machine set forth in the present application are also embodied in the machine described in a prior application filed by me on Sept. 20, 1898, Serial No. 692,298 and it is intended to claim broadly in said prior application the inventions common to these two cases, including the novel arrangement of the registering racks with reference to the counter and to the actuating devices, and also the construction which concerns the peculiar method of disengagement of the registering racks from the counter.

I claim—

1. In a cash register, the combination with a series of keys, of a laterally shiftable rocking member common to and actuated by the keys; an accounting mechanism; a movable frame; means carried thereby for actuating the accounting mechanism, normally disconnected therefrom and arranged to be differentially operated by the keys; means for moving the said frame by the rocking of the common member, to connect the accounting mechanism with its actuating means; and means for laterally shifting the said common member by its co-action with the movable frame, substantially as and for the purpose described.

2. In a cash register, the combination with a series of keys, of a laterally shiftable rocking member common to and actuated by the keys; an accounting mechanism; a movable frame; means carried thereby for actuating the accounting mechanism, normally disconnected therefrom and arranged to be differentially operated by the keys; means for moving the said frame by the rocking of the common member, to connect the accounting mechanism with its actuating means, and for supporting the latter in its displaced position.

3. In a cash register, the combination with a series of keys, of a laterally shiftable rocking member common to and actuated by the keys; an accounting mechanism; a movable frame; means carried thereby for actuating the accounting mechanism, normally disconnected therefrom and arranged to be differentially operated by the keys; means for moving the said frame by the rocking of the common member, to connect the accounting mechanism with its actuating means; and means for laterally shifting the said common member first in one direction and then in the opposite direction by its co-action with the movable frame.

4. In a cash register, the combination with a series of keys, of a laterally shiftable rocking member common to and actuated by the keys; an accounting mechanism; a movable frame; means carried thereby for actuating the accounting mechanism, normally disconnected therefrom and arranged to be differentially operated by the keys; means for the moving of said frame by the rocking of the common member, to connect the accounting mechanism with its actuating means, and means for laterally shifting the said common member by its co-action with the movable frame, said means comprising reversely disposed cams on the rocking frame and coöperating projections on the common member substantially as described.

5. In a cash register, the combination with a series of keys, of a laterally movable rocking member common to and actuated by said keys, a rock-frame, register actuating devices carried thereby, a cam carried upon the common member for rocking said frame and a camming device carried upon the common member for laterally shifting the same and for supporting the rock-frame after said member has been shifted.

6. In a cash register, the combination with a series of keys, of a laterally movable rocking member common to and actuated by said keys, a rock-frame, a cam on the common member for rocking said frame, a cam on said rock-frame, an arm on said common member adapted to engage said cam on the rock-frame to laterally shift said common member and to support said frame after the common member has been shifted, a counter, and counter operating devices mounted on said rock-frame and adapted to be actuated by the keys substantially as described.

7. In a cash register, the combination with a series of keys, a counter, means for actuating the same from the keys, and transfer devices for said counter; of a member which is common to and moves with the said keys, with provisions between said member and the said transfer devices for positively actuating the latter during movements of said member in opposite directions.

8. In a cash register, the combination with a series of keys, a counter and transfer devices therefor, of a laterally shifting member which is common to and moves with said keys in two opposite directions and which operates the said transfer devices on both said movements in opposite directions.

9. In a cash register, the combination with a series of keys, a counter and transfer devices therefor, of an oscillating member common to said keys, means for laterally shifting said member, and operating devices mounted upon said member and co-acting with said transfer devices in both directions of oscillation of said member.

10. In a cash register, the combination with a series of keys and a counter including a transfer element; of a transfer pawl controlled as to operative adjustment by said transfer element; and an oscillating member common to and moving with said keys and having an arm adapted to operate said transfer pawl in both directions of oscillation of said member.

11. In a cash register, the combination with a series of keys, and a counter including transfer elements; of a transfer pawl, an oscillating member common to and moving with said keys, means for laterally shifting said oscillating member, and a single arm carried by the latter adapted to operate the said transfer pawl in both directions of oscillation of said member.

12. In a cash register, the combination with a series of keys, and a counter having transfer elements; of a transfer pawl, two arms connected with said transfer pawl, a laterally shifting oscillating member common to and actuated by said keys, a single arm carried upon said member adapted to act successively on the two arms of the said transfer pawl.

13. In a cash register, the combination with a series of keys, of a counter having transfer elements and a transfer pawl, two arms connected with said transfer pawl, a laterally shifting oscillating member common to and actuated by said keys, and a single arm carried upon said member adapted to act upon one of said arms of the transfer pawl during the movement in one direction, and to act upon the other arm of said transfer pawl during the movement in the opposite direction of said oscillating member.

14. In a transfer mechanism, the combination with the registering wheels, actuating mechanism therefor, a transfer pawl, and means for reciprocating the same; of means for tripping the transfer pawl, with provisions existing by virtue of which the latter normally remains out of coöperative relation with the tripping mechanism.

15. In a transfer mechanism, the combination with the register wheels, actuating mechanism therefor, a transfer pawl, and means for reciprocating the same; means for tripping the transfer pawl, with provisions existing by virtue of which the latter normally remains out of coöperative relation with the tripping mechanism, and means for moving said transfer pawl into operative relation with respect to the tripping mechanism upon the initial movement of the counter operating mechanism.

16. In a cash register, the combination with a series of keys, a counter, means for actuating the latter from the keys, and a transfer pawl; of means for tripping the transfer pawl, with provisions existing by virtue of which the latter remains out of coöperative relation with the tripping mechanism; and a member common to and operated by said keys; and means operated by said common member to move said transfer pawl into operative relation with said tripping means upon the initial movement of said member and to move the said transfer pawl out of operative relation with said tripping means during the final movement of said common member.

17. In a transfer mechanism, the combination with the registering wheels, actuating mechanism therefor, a transfer pawl, and means for reciprocating the same; of a trip-latch mounted upon said pawl and normally holding the same in inoperative adjustment; and means for tripping the transfer pawl by displacement of the trip-latch, the latter being normally in inoperative relation to the tripping means.

18. In a transfer mechanism, the combination with the registering wheels, actuating mechanism therefor, a transfer pawl, and means for reciprocating the same; of a trip-latch mounted upon said transfer pawl and normally holding the same in inoperative adjustment; means for tripping the transfer pawl by displacement of the trip-latch, the latter being normally in inoperative relation to the tripping means; and means for moving said trip-latch into operative relation with respect to the tripping means upon the initial movement of the counter operating mechanism.

19. In a register, the combination with a counter having transfer elements, actuating mechanism therefor, a transfer pawl and means for reciprocating the same; of a trip-latch mounted on said pawl and normally engaging a fixed abutment to maintain said pawl inoperative as to effecting a transfer, the normal position of said pawl being such that the said latch is retracted from operative relation with the tripping element on the counter.

20. In a register, the combination with a counter having transfer elements, actuating mechanism therefor, a transfer pawl and means for reciprocating the same; of a trip-latch mounted on said pawl and normally engaging a fixed abutment to maintain said pawl inoperative as to effecting a transfer, the normal position of said pawl being such that the said latch is retracted from operative relation with the tripping element on the counter; with provisions carried by said trip-latch for preventing premature tripping of the same by an overthrow movement of said tripping element.

21. In a register, the combination with a counter having transfer elements, actuating mechanism therefor, a transfer pawl and means for reciprocating the same; of a trip-latch mounted on said pawl and normally engaging a fixed abutment to maintain said pawl inoperative as to effecting a transfer, the normal position of said pawl being such that the said latch is retracted from operative relation with the tripping element on the counter; with provisions carried by said trip-latch for preventing premature tripping of the same by an overthrow movement of said tripping element; and means for restoring said trip-latch from its tripped position to its normal position in engagement with said fixed abutment.

22. In a cash register, the combination with a series of keys, of a laterally moving key-coupler common to said keys; an arrester rack mounted upon said coupler; an arrester pawl normally in the path of said rack and adapted to prevent the movement thereof in one direction; a second arrester pawl adapted to engage said rack only when the key-coupler has been shifted and to prevent the movement of said rack in the opposite direction; and means for shifting said key-coupler.

23. In a cash register, the combination with a series of keys and a laterally shifting arrested key coupling member having a main arrester rack and an auxiliary arrester rack; means for shifting said member; an arrester pawl normally in the path of engagement with the main rack and adapted to prevent the movement thereof in one direction; a second arrester pawl normally out of the path of engagement with said main rack, but adapted to be brought into engagement therewith when the said arrested member is shifted and adapted to prevent the movement thereof in the opposite direction; and an auxiliary arrester pawl adapted to engage said auxiliary rack and to remain in engagement therewith while the said arrested member is being shifted.

24. In a cash register, the combination with a series of keys an arrested key coupling member, of an arresting member normally in the plane of engagement with said arrested member and adapted to prevent the movement in one direction thereof; and a second arresting member normally out of the plane of engagement with said arrested member and adapted when in engagement therewith to prevent the movement thereof in the opposite direction; and means for shifting the relative positions of said members whereby the second arresting member is brought into the plane of engagement with the arrested member and the first arresting member is brought out of the plane of engagement with said arrested member.

25. In a cash register, the combination with an arresting member, of a series of keys an arrested key coupling member, and means for shifting one of said members laterally to carry the same out of confronting alinement with the other member.

26. In a cash register, the combination with an arresting member, of a series of keys an arrested key coupling member normally in operative alinement with said arresting member and confronting the same, and means for moving one of said members laterally to carry the same out of confronting alinement with the other member.

27. In a cash register, the combination of a series of keys an arrested key coupling member having a main arrester surface and an auxiliary arrester surface, two pawls adapted to engage the main arrester surface, and a third arrester pawl adapted to engage the auxiliary arrester surface, substantially as and for the purpose described.

28. In a cash register, the combination with a counter, transfer devices, an oscillating transfer operating member, means for laterally shifting the same, and operating devices on said member co-acting with the transfer devices in both directions of oscillation.

29. In a cash register, the combination with a plurality of keys, of a counter controlled thereby, transfer devices, an oscillating transfer operating member movable with the keys, means for laterally shifting the same, and operating devices on said member co-acting with the transfer devices in both directions of oscillation.

30. In a cash register, the combination with a counter, transfer devices with two arms in different planes, an oscillating transfer operating member, means laterally shifting the member at each operation, and operating devices pivoted on said member adapted to co-act with the respective arms in the respective directions of oscillation.

31. In a cash register, the combination with a plurality of keys, of a counter controlled thereby, transfer devices for said counter with two arms in different planes, an oscillating transfer operating member movable with the keys, means for laterally shifting said member, and operating devices pivoted on said member adapted to co-act with the separate arms in opposite directions of oscillation.

32. In a cash register, the combination with a counter, of transfer pawls therefor, trip pawls normally out of operative relation with the counter, means for moving the trip pawls into position to co-act with the counter at each operation, and means for reciprocating the transfer pawls at each operation of the machine.

33. In a cash register, the combination with a counter, of transfer devices therefor, trip pawls, pins on the counter for operating same, and a projection on the trip pawl for locking the same to the pin during the tripping movement of the pin.

34. In a cash register, the combination with a counter, transfer pawls therefor, trip pawls carried thereby, said pawls being normally held out of operative relation with the counter, means for moving the transfer pawls to carry the trip pawls into position to co-act with the counter, means for operating the transfer pawls, and a stationary projection for resetting the trip pawls after the operation of the counter.

35. In a cash register, the combination with a counter, of transfer pawls therefor, trip pawls carried by said transfer pawls, and trip devices on the counter for operating the trip pawls, the trip pawls having provisions for preventing the trip of same by an overthrow of the counter.

36. In a cash register, the combination with a series of keys an arrested key coupling member, two oppositely directed pawls mounted independently of said member, a rod on which said pawls are pivoted, and means for shifting the arrested member to bring one or the other of the pawls into operative relation therewith.

37. In a cash register, the combination with a plurality of keys, with a key coupling member common thereto and movable therewith, and having a rack, pawls preventing motion of the rack in reverse direction, and means for shifting the rack to bring it into operative relation with one or the other of the pawls.

38. In a cash register, the combination with a counter, of registering racks, a shaft on which the racks are mounted, means for moving the shaft to carry the racks into and out of mesh with the counter, and means for completely restoring the racks to normal position.

39. In a cash register, the combination with a series of keys an arrested key coupling member, of two oppositely directed pawls, a rod on which said pawls are pivoted, and means for shifting the arrested member from one to the other of two different planes of movement to engage one or the other of said pawls.

In testimony whereof I affix my signature, in the presence of two witnesses.

THOMAS CARROLL.

Witnesses:
H. C. WOOD,
J. B. HAYWARD.